US011115745B2

(12) United States Patent
Grebe et al.

(10) Patent No.: US 11,115,745 B2
(45) Date of Patent: Sep. 7, 2021

(54) SYSTEMS AND METHODS FOR ANTENNA AND GROUND PLANE MOUNTING SCHEMES FOR IN-EAR HEADPHONE

(71) Applicant: BOSE CORPORATION, Framingham, MA (US)

(72) Inventors: Richard Arthur Grebe, Stow, MA (US); David Partridge, Princeton, MA (US)

(73) Assignee: BOSE CORPORATION, Framingham, MA (US)

( * ) Notice: Subject to any disclaimer, the term of this patent is extended or adjusted under 35 U.S.C. 154(b) by 199 days.

(21) Appl. No.: 16/239,940

(22) Filed: Jan. 4, 2019

(65) Prior Publication Data

US 2020/0221210 A1   Jul. 9, 2020

(51) Int. Cl.
*H04R 1/10* (2006.01)
*H04R 1/02* (2006.01)
*H01M 50/109* (2021.01)
*H01M 50/216* (2021.01)

(52) U.S. Cl.
CPC ........ *H04R 1/1025* (2013.01); *H01M 50/109* (2021.01); *H01M 50/216* (2021.01); *H04R 1/02* (2013.01); *H04R 1/1016* (2013.01)

(58) Field of Classification Search
CPC ...... H04R 1/1025; H04R 1/02; H04R 1/1016; H01M 2/0222; H01M 2/1044

USPC ......................................................... 381/380
See application file for complete search history.

(56) References Cited

U.S. PATENT DOCUMENTS

| 7,570,218 | B2 | 8/2009 | Tsujimura et al. | |
| 2008/0100521 | A1 | 5/2008 | Herbert et al. | |
| 2013/0135836 | A1* | 5/2013 | Roberts .................. | H05K 3/366 |
| | | | | 361/803 |
| 2018/0254546 | A1 | 9/2018 | Shamsoddini | |

FOREIGN PATENT DOCUMENTS

JP          2016063144 A          4/2016

OTHER PUBLICATIONS

International Search Report and Written Opinion in International Application No. PCT/US2019/068405 dated Mar. 24, 2020.

* cited by examiner

*Primary Examiner* — Sean H Nguyen
(74) *Attorney, Agent, or Firm* — Lando & Anastasi, LLP

(57) ABSTRACT

Systems and methods are directed to a wireless headphone comprising a wireless headphone cap comprising an antenna, and a printed circuit board configured to be directly mechanically connected to the wireless headphone cap at a fixed distance from the wireless headphone cap, and electrically connected to the antenna.

13 Claims, 7 Drawing Sheets

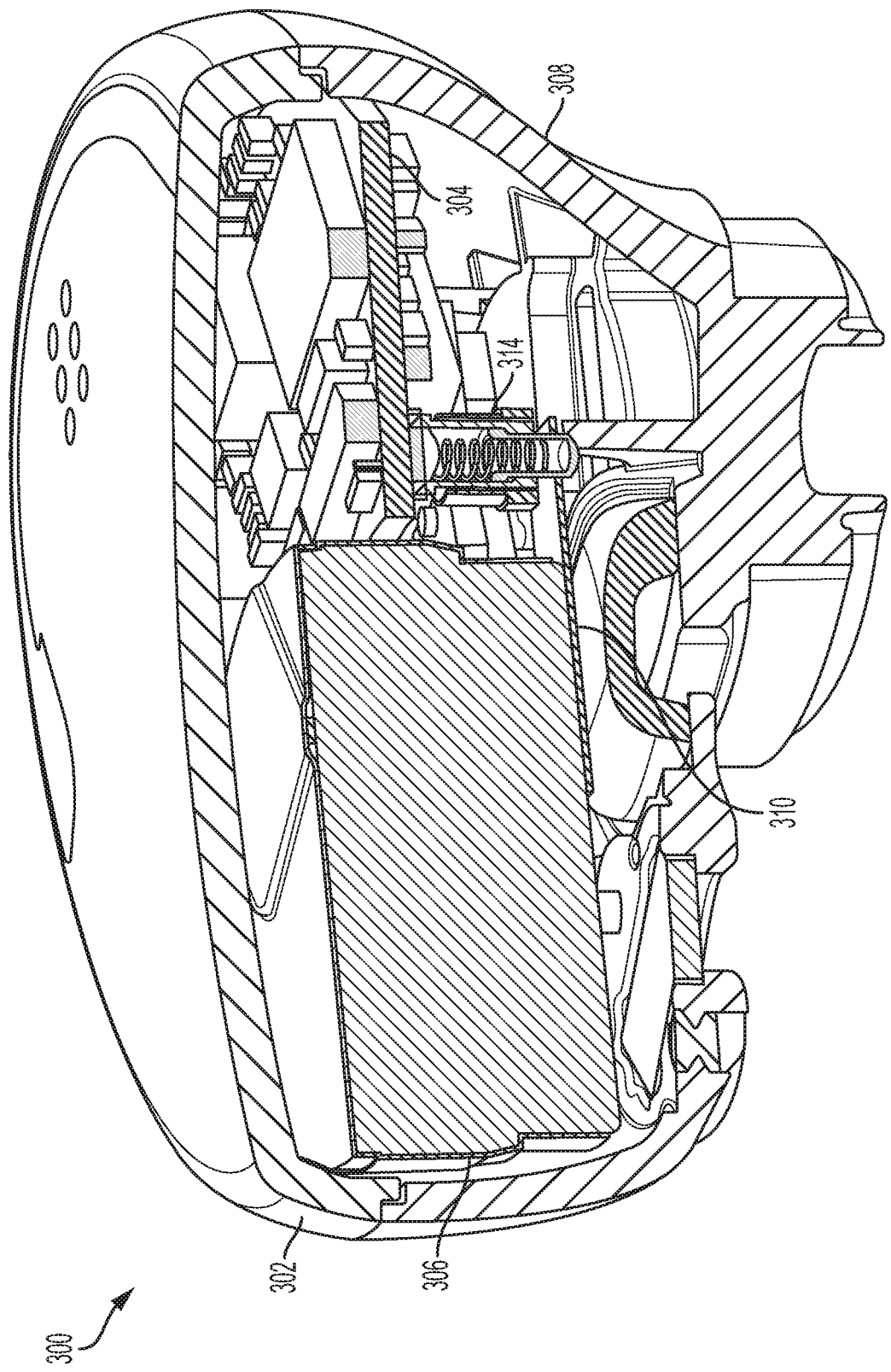

SYSTEMS AND METHODS FOR ANTENNA AND GROUND PLANE MOUNTING SCHEMES FOR IN-EAR HEADPHONE

CROSS-REFERENCE TO RELATED APPLICATION

This application is related to U.S. patent application Ser. No. 16/239,934 filed on Jan. 4, 2019, and titled SYSTEMS AND METHODS FOR UNCONSTRAINED BATTERY SPRING TAB ASSEMBLIES FOR IN-EAR HEADPHONE, which is herein incorporated by reference in its entirety for all purposes.

BACKGROUND

1. Field of the Disclosure

At least one example in accordance with the present disclosure relates generally to wireless headphones.

2. Discussion of Related Art

The use of headphones, such as wireless in-ear headphones, is generally known. Wireless headphones generally include one or more components to enable wireless communication with an audio source. For example, wireless headphones may include antennas configured to receive signals encoding audio information from an audio source. It may be advantageous to tune antennas to a desired resonant frequency to minimize antenna frequency detuning.

SUMMARY

According to one aspect, a wireless headphone is provided comprising a wireless headphone cap comprising an antenna, and a printed circuit board (PCB) configured to be directly mechanically connected to the wireless headphone cap at a fixed distance from the wireless headphone cap, and electrically connected to the antenna.

In examples, the PCB is configured to be coupled to the wireless headphone cap at a repeatable distance from the wireless headphone cap.

In some examples, the antenna is formed using laser direct structuring.

In certain examples, the PCB is configured to be electrically connected to the antenna via a pogo pin.

In examples, the pogo pin comprises a first end and a second end, and a first end of the pogo pin is configured to be mechanically coupled to the PCB, and a second end of the pogo pin is configured to contact the wireless headphone cap.

In certain examples, the wireless headphone cap comprises a first surface and a second surface, and the antenna is formed on the first surface of the wireless headphone cap, the second end of the pogo pin is configured to contact the second surface of the wireless headphone cap, and the first surface of the wireless headphone cap is electrically connected to the second surface of the wireless headphone cap through a via formed through the wireless headphone cap.

In examples, a length of a conductive path between the via and the PCB is approximately equal to a distance between the second surface of the wireless headphone cap and the PCB.

In some examples, the PCB is configured to be directly mechanically connected to the wireless headphone cap using heat stakes.

In examples, a resonant frequency of the antenna corresponds directly to a distance between the PCB and the wireless headphone cap.

In certain examples, the distance between the PCB and the wireless headphone cap corresponds directly to a tolerance in a length of the heat stakes.

According to another aspect, a system is provided comprising an antenna formed in a first body, and a printed circuit board (PCB) configured to be directly mechanically connected to the first body at a fixed distance from the first body, and electrically connected to the antenna.

In examples, the PCB is configured to be coupled to the wireless headphone cap at a repeatable distance from the wireless headphone cap.

In examples, the system further comprises a wireless headphone housing, wherein the wireless headphone housing is configured to be mechanically coupled to the first body.

In some examples, the antenna is formed in the first body using laser direct structuring.

In certain examples, the PCB is configured to be electrically connected to the antenna via a pogo pin.

In examples, the pogo pin comprises a first end and a second end, and a first end of the pogo pin is configured to be mechanically coupled to the PCB, and a second end of the pogo pin is configured to contact the first body.

In some examples, the first body comprises a first surface and a second surface, and the antenna is formed on the first surface of the first body, the second end of the pogo pin is configured to contact the second surface of the first body, and the first surface of the first body is electrically connected to the second surface of the first body through a via formed through the first body.

In certain examples, the PCB is configured to be directly mechanically connected to the first body using heat stakes.

According to another aspect, a method of producing a wireless headphone is provided comprising acts of providing a wireless headphone cap coupled to an antenna, mechanically coupling a printed circuit board (PCB) directly to the wireless headphone cap at a fixed distance from the wireless headphone cap, electrically coupling the PCB to the antenna, and mechanically coupling the wireless headphone cap to a wireless headphone housing.

In examples, the PCB is configured to be coupled to the wireless headphone cap at a repeatable distance from the wireless headphone cap.

In some examples, electrically coupling the PCB to the antenna comprises mechanically coupling a pogo pin to the PCB, and electrically coupling the pogo pin between the PCB and the antenna.

In certain examples, the wireless headphone cap comprises heat stakes, and wherein mechanically coupling the PCB directly to the wireless headphone cap comprises inserting the heat stakes through openings in the PCB, and heating the heat stakes to mechanically couple the heat stakes to the PCB.

In examples, mechanically coupling the wireless headphone cap to the wireless headphone housing comprises mechanically coupling the wireless headphone cap to the wireless headphone housing subsequent to heating the heat stakes to mechanically couple the heat stakes to the PCB.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of any particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

FIG. 3B illustrates a second cross-sectional view of a wireless headphone according to the second example;

DETAILED DESCRIPTION

Figure 1A:
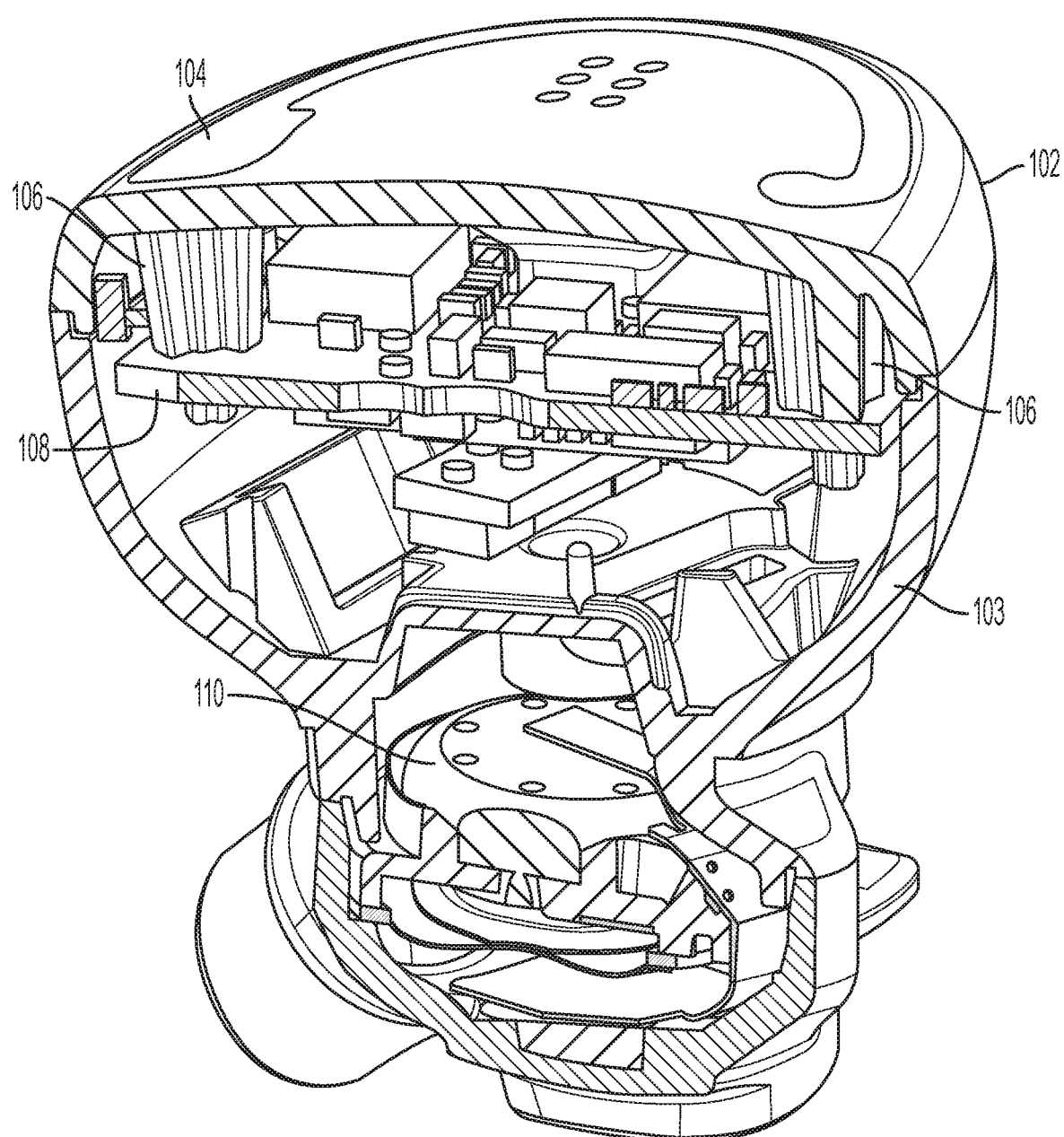
FIG. 1A illustrates a first cross-sectional view of a wireless headphone according to a first example.

Wireless headphone architectures having a high degree of repeatability are provided. The wireless headphone architectures are "repeatable," or capable of being consistently manufactured with a tolerable degree of variation, because they are constructed such that variations in a distance between a wireless headphone antenna and a PCB ground plane are minimized. In one example, the variations in the distance between the antenna and the PCB ground plane are minimized by directly mechanically coupling a cap in which the antenna is formed with the PCB ground plane. Directly mechanically coupling the cap with the PCB ground plane may require blind assembly of the wireless headphone; thus, a battery configuration is provided which makes blindly assembling the wireless headphone more reliable. Repeatability in the length of the conductive path provides repeatability in wireless headphones' resonant frequencies, which minimizes frequency detuning. Accordingly, the wireless headphone architectures provided herein are less prone to frequency detuning.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular may also embrace examples including a plurality, and any references in plural to any example, component, element or act herein may also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

A headphone or earphone refers to a device that typically fits around, on, in, or near an ear and that radiates acoustic energy into or towards the ear canal. Headphones and earphones are sometimes referred to as earpieces, headsets, earbuds, or sport headphones, and can be wired or wireless. A headphone includes an electro-acoustic transducer driver to transduce audio signals to acoustic energy. The acoustic driver may be housed in an earcup, earbud, or other housing. Some of the figures and descriptions following show a single headphone device. A headphone may be a single stand-alone unit or one of a pair of headphones (each including at least one acoustic driver), one for each ear. A headphone may be connected mechanically and/or electrically to another headphone, for example by a headband and/or by leads that conduct audio signals to an acoustic driver in the headphone. A headphone may include components for wirelessly receiving audio signals. A headphone may include components of an active noise reduction (ANR) system. Headphones may also include other functionality, such as a microphone. A headphone may also be an open-ear device that includes an electro-acoustic transducer to radiate acoustic energy towards the ear canal while leaving the ear open to its environment and surroundings.

Wireless headphones play audio to a user based on information received from an audio source. An audio source may include a computing device (for example, a laptop computer, desktop computer, tablet, smartphone, or other electronic computing device) configured to communicate wireless signals encoding audio information to the wireless headphones. An antenna of the wireless headphones receives the wireless signals, generates electrical signals based on the wireless signals, and provides the electrical signals to transducer circuitry coupled to a printed circuit board (PCB) having a ground plane. The ground plane serves as the return path for current from components on the PCB, and the antenna is advantageously mounted parallel to, and at a fixed distance from, the ground plane. The transducer circuitry provides control signals to a transducer, such as a speaker. The transducer generates mechanical signals (i.e., audio) for playback to a user based on the control signals.

It is generally advantageous to tune a wireless headphone according to a resonant frequency of the antenna. An antenna's resonant frequency may depend on a length of a conductive path between the antenna and the PCB ground plane, as well as a distance from the antenna to the parallel-oriented PCB ground plane. When producing a large volume of wireless headphones, it may be advantageous to minimize a variation in a respective distance between each of the headphones' respective antenna and PCB ground plane. Minimizing the variation between the headphones' antennas and PCBs minimizes a variation between the headphones' resonant frequencies. Minimizing the variation between the headphones' resonant frequencies yields headphones that are less prone to frequency detuning. Accordingly, minimizing a variation in the distance between a headphone antenna and a headphone PCB may increase a reliability of wireless headphones' frequency characteristics, and minimize or eliminate a need to separately tune each antenna to account for such variation.

In certain conventional wireless headphone architectures, a length of a conductive path connecting an antenna to a PCB may vary considerably. For example, the antenna may be electrically coupled to the PCB using wires soldered to one or both of the antenna and the PCB. Establishing an electrical connection between two points using a wire may be achieved using wires having widely variable lengths. For example, while the wire needs to be at least as long as the distance between the two points, the wire may be significantly longer if the wire does not pass directly from one point to the other (i.e., if the wire is not perfectly straight). Because a length of a conductive path between an antenna and a PCB may vary significantly using conventional wire-based techniques, a resonant frequency of the antenna may also vary significantly. Achieving consistent wire lengths in a repeated manufacturing process may be particularly difficult where the device is assembled using a blind assembly of some of the electrical connections.

Examples of the present disclosure are directed to a wireless headphone architecture that minimizes a variation in wireless headphone antennas' resonant frequencies. In one example, a wireless headphone antenna is formed in a wireless headphone cap using laser direct structuring (LDS). A PCB is mechanically connected directly to the cap (which may otherwise serve a cosmetic purpose) in which the antenna is formed. In some examples, the mechanical connection is made using heat stakes. A distance between the LDS antenna and the PCB therefore directly corresponds to a tolerance in the heat stakes' length. The PCB is electrically connected to the antenna using pogo pins in one example, such that a length of a conductive path between the PCB and the antenna directly corresponds to a distance between the PCB and the antenna. Accordingly, a variability in the length of the conductive path between the PCB and the antenna directly corresponds to a distance between the LDS antenna and the PCB, that is, in turn, controlled by the size of the heat stakes connecting the LDS antenna to the PCB. Wireless headphones' resonant frequencies may therefore be limited only by a tolerance in the size of the heat stakes connecting the antenna to the PCB, which can be kept relatively small under controlled manufacturing processes.

Figure 1B:
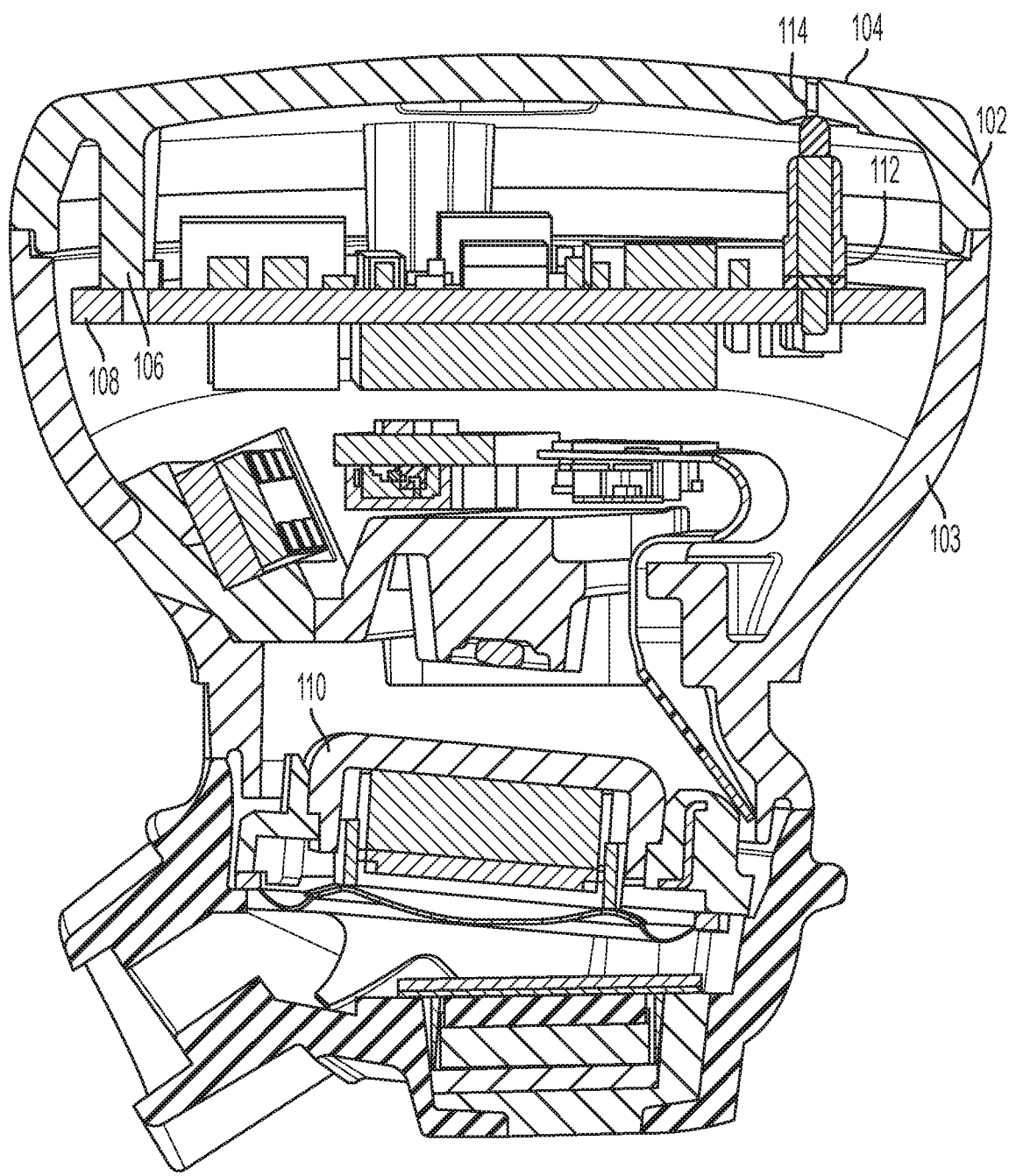
FIG. 1B illustrates a second cross-sectional view of the wireless headphone according to the first example.

Examples of the disclosure will now be described with respect to the figures. FIG. 1A illustrates a first cross-sectional view of a wireless headphone 100 according to an example. The wireless headphone 100 includes a cap 102, a housing 103, an antenna 104, heat stakes 106, a PCB 108, and an electro-acoustic transducer 110. FIG. 1B illustrates a second cross-sectional view of the wireless headphone 100. The wireless headphone 100 includes the cap 102, the housing 103, the antenna 104, the heat stakes 106, the PCB 108, the transducer 110, and a pogo pin 112. An electrically conductive via 114 is formed through the cap 102.

The antenna 104 is configured to receive wireless audio signals from an audio source, and generate electrical signals based on the received wireless audio signals. The electrical signals are provided to the PCB 108 through the pogo pin 112 and the via 114, which is electrically coupled to the antenna 104 via the pogo pin 112. The PCB 108, which is configured to receive electrical power from a battery (not illustrated), provides control signals to the transducer 110 to generate mechanical audio (i.e., acoustic) signals for playback to a user. In some examples, the antenna 104 may be further configured to provide wireless signals to the audio source, such as where the wireless headphone 100 includes a microphone and the audio source is a telephone.

The cap 102 is mechanically coupled to the housing 103. For example, the cap 102 may be mechanically coupled to the housing 103 via an interference fit, via an adhesive, or via other coupling means or methods. The cap 102 is also mechanically coupled to the PCB 108 via the heat stakes 106. Heat staking is a method of using studs (for example, plastic studs) to provide a mechanical connection between two bodies. The studs may be a protruding part of a first of the two bodies. During assembly, the heat stakes are inserted into openings in the second of the two bodies. The studs are then heated to a temperature at or approaching their melting point, causing them to expand to fill the openings, thereby providing an interference fit between the two bodies where the expanded studs contact the inner surface of the openings in the second body.

In FIGS. 1A and 1B, the cap 102 may be a first body, and the PCB 108 may be a second body, coupled together via the heat stakes 106. Although the cap 102 and the heat stakes 106 are identified separately for clarity, the heat stakes 106 may a part of the cap 102 that protrudes outward through openings in the PCB 108.

The antenna 104 is formed in the cap 102. For example, the antenna 104 may be formed using LDS techniques. LDS is a method of forming antennas in a surface (for example, a plastic surface) of a body. The body may be composed of a resin doped with a metallic inorganic compound. A laser is directed at the resin, which conditions the surface of the resin for metallization where the laser strikes the resin. The laser is moved to trace a shape of the antenna, conditioning the resin as the laser moves. The laser may be concentrated in one area to generate a through or blind via through the resin, and to condition the surrounding surfaces of the via. The body is given one or more acid baths in which metallic layers are deposited on the regions of the body that have been conditioned by the laser. For example, the metallic layers may include a copper layer, followed by a nickel layer, followed by a gold layer. In FIGS. 1A and 1B, the cap 102 may be a body composed of a resin doped with a metallic inorganic compound. The antenna 104 and via 114 may be formed using LDS techniques in the cap 102 using a laser (not illustrated).

The antenna 104 is electrically coupled to the PCB 108 via the pogo pin 112. A pogo pin is a spring-loaded conductive electrical connector configured to electrically connect a first body to a second body. A first end of the pogo pin can be fixedly connected to a surface of the first body, and a second end of the pogo pin can expand under a restoring force of an internal spring until contacting a surface of the second body (or until the spring is at its equilibrium length). If the first body and the second body are moved apart in a direction of the pogo pin axis, the pogo pin will expand from the restoring force. Accordingly, a length of an electrical connection between the surface of the first body and the surface of the second body is approximately equal to the distance between the first body and the second body.

In FIGS. 1A and 1B, the pogo pin 112 may be configured to expand to a length approximately equivalent to a distance between the cap 102 and the PCB 108. For example, the pogo pin 112 may be mechanically coupled to the PCB 108 (for example, via a soldered connection) at a first end, and may expand to contact the via 114 at a second end. The pogo pin 112 may be composed of, and/or plated with, an electrically conductive material (for example, gold) to provide a conductive path from the antenna 104 to the PCB 108. For example, electrical signals generated by the antenna 104 may be provided to the PCB 108 through the pogo pin 112 and the via 114.

By forming the antenna 104 in the cap 102, and by mounting the PCB 108 directly to the cap 102 via heat stakes 106, a distance between the antenna 104 and the PCB 108 may be precisely controlled through tight tolerances in the manufacturing process. A variation in a distance between the cap 102 and the PCB 108 may be minimized because the cap 102 and the PCB 108 are directly mechanically coupled together. Thus, the variation in the distance between the cap 102 and the PCB 108 is attributable primarily to the tolerance of the heat stakes' 106 length.

Because the length of the electrical connection from the antenna 104 to the PCB 108 is approximately equal to the distance between the antenna 104 and the PCB 108, the length of the electrical connection from the antenna 104 to the PCB 108 may be tightly controlled. More specifically, the variation in the length of the electrical connection from the antenna 104 to the PCB 108 is approximately equal to the tolerance in the length of the heat stakes 106.

Although specific examples have been provided, alternate examples may also be within the scope of the disclosure. For example, although the antenna 104 is illustrated as being mechanically connected to the PCB 108 via heat stakes 106, in alternate examples, other mechanical connectors may be implemented to mechanically connect the antenna 104 to the PCB 108. Similarly, although the antenna 104 is illustrated as being electrically connected to the PCB 108 through the via 114 and the pogo pin 112, in alternate examples, other electrical connectors may be implemented to electrically connect the antenna 104 to the PCB 108. Furthermore, although the antenna 104 is described as being constructed using LDS techniques, other known techniques may be employed to construct the antenna 104.

Figure 2:
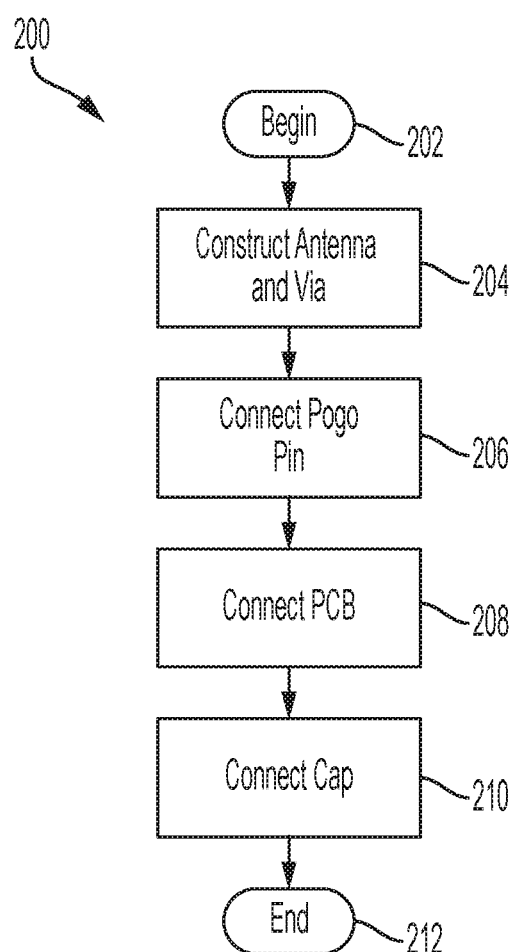
FIG. 2 illustrates a process of producing a wireless headphone.

FIG. 2 illustrates a process 200 of forming a wireless headphone. For example, the process 200 may involve forming the wireless headphone 100. However, the process 200 may involve forming a wireless headphone other than the wireless headphone 100, such as the wireless headphone discussed below with respect to FIGS. 3A-3C.

The process 200 includes acts of constructing an antenna (for example, antenna 104) and a via (for example, via 114) in a cap (for example, cap 102), connecting a pogo pin (for example, pogo pin 112) to a PCB (for example, PCB 108), connecting the PCB to the cap, and connecting the cap to a housing (for example, housing 103). Although the process 200 lists acts 202-212 as occurring in the illustrated order, acts 202-212 may be executed in an alternate order in alternate examples.

At act 202, the process 200 begins.

At act 204, an antenna and via are constructed in a wireless headphone cap. For example, the antenna 104 and the via 114 may be constructed on the cap 102 using the LDS techniques discussed above.

At act 206, a pogo pin is connected to a PCB. For example, connecting the pogo pin 112 to the PCB 108 may include soldering an end of the pogo pin 112 to the PCB 108. In another example, the pogo pin 112 may be held in electrical connection with the PCB 108 and the antenna 104 by the restoring force of the pogo pin 112.

At act 208, the PCB is connected to the cap. For example, connecting the PCB 108 to the cap 102 may include inserting the heat stakes 106, which protrude from the cap 102, through openings in the PCB 108. After inserting the heat stakes 106 through openings in the PCB 108, the heat stakes 106 may be heated to expand. After expansion, the heat stakes 106 provide an interference fit that mechanically couples the cap 102 to the PCB 108.

At act 210, the cap is connected to a housing. For example, connecting the cap 102 to the housing 103 may include connecting the cap 102 and the PCB 108, which are mechanically coupled together via the heat stakes 106, to the housing 103 via an interference fit along a circumference of the cap 102. In another example, connecting the cap 102 to the housing 103 may include connecting the cap 102 to the housing 103 using an adhesive. Connecting the cap 102 and the PCB 108 may further include electrically coupling the PCB 108 to a battery, as discussed below with respect to FIGS. 3A-4. At act 212, the process 200 ends.

As discussed above, the PCB 108 is configured to receive electrical power from a battery which is disposed within the housing 103. Connecting the PCB 108 to the battery (i.e., creating a conductive connection through which electrical power may be provided by the battery to the PCB 108) may include a "blind assembly." Blind assembly, in this context, refers to the assembly of a wireless headphone without being able to observe electrical connections which are formed as a result of the mechanical assembly of the headphone.

Conventional wireless headphone architectures, such as those in which a cap is not mechanically connected to a PCB, may not involve blind assembly. More particularly, electrically connecting a headphone PCB to a battery may not be performed blindly in conventional architectures. For example, a PCB may be inserted into a wireless headphone housing and, subsequent to insertion, mechanically and electrically coupled to other components of the wireless headphone. The PCB may be electrically coupled to a battery, for example, after insertion. Once all of the requisite mechanical and electrical connections of the PCB have been formed and visually inspected, the cap (which is not mechanically connected to the PCB) can be mechanically connected to the wireless headphone housing. Thus, such a conventional architecture is not blindly assembled because the cap is installed (thus obscuring the contents of the wireless headphone) only after the requisite mechanical and electrical connections of the PCB have been formed and inspected.

In some examples, design considerations may call for blind assembly of the wireless headphone 100 such that the PCB 108 is directly mechanically connected to the cap 102. As discussed above with respect to act 210, installing the PCB 108 in the housing 103 occurs in conjunction with installing the cap 102 in the housing 103. Installing the cap 102 obscures the contents of the wireless headphone 100 from view. Because installing the PCB 108 and the cap 102 occurs simultaneously (thus obscuring the contents of the wireless headphone 100), the contents of wireless headphone 100 cannot be visually inspected after the PCB 108 is inserted. Thus, the PCB 108 cannot be visually inspected to ensure that the PCB 108 is properly electrically connected to a battery.

Wires could be used to connect the PCB 108 to the battery prior to connecting the cap 102 to the housing 103, which would enable an entity assembling the wireless headphone 100 to visually inspect the PCB 108 to ensure that the PCB 108 is properly electrically connected to the battery before mechanically connecting the cap 102 to the housing 103. However, as discussed above, the use of wires may produce a widely variable amount of noise which may need to be accounted for in tuning the antenna 104. Accordingly, it would be advantageous to provide a wireless headphone architecture capable of supporting a cap-mounted PCB produced according to the process 200 while addressing potential issues associated with blind wireless headphone assembly.

A wireless headphone architecture is provided that is suited to blind assembly with a cap-mounted PCB. A wireless headphone battery is positioned to be adjacent to a PCB when the PCB is inserted. The wireless headphone battery includes two electrical contacts to couple to the PCB. In one example, a first electrical contact is a spring tab configured to connect to a PCB castellation when the PCB is inserted into the wireless headphone housing. In an example, a second electrical contact is a tab configured to connect to connect to a PCB pogo pin when the PCB is inserted into the wireless headphone housing.

Figure 3A:
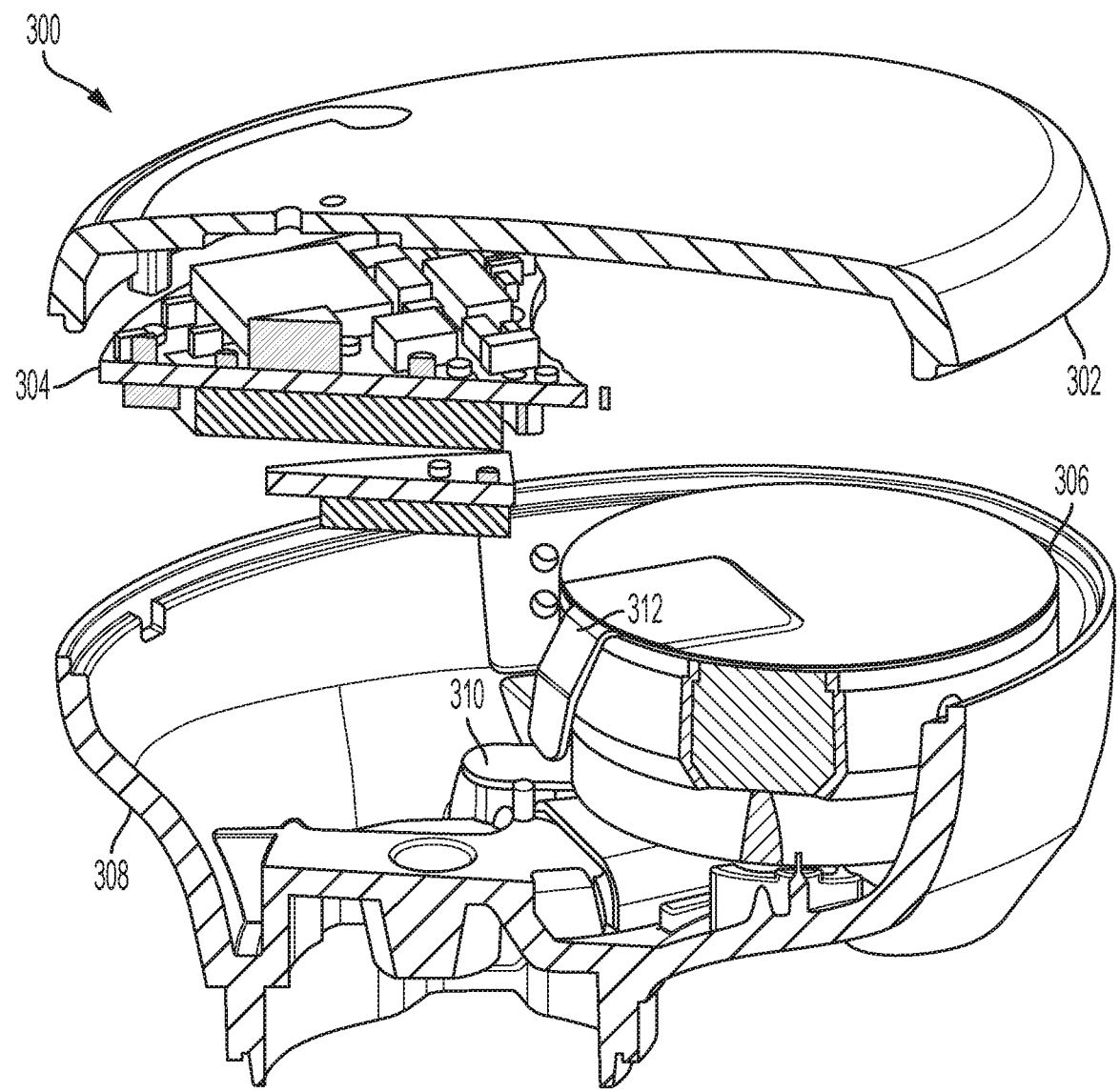
FIG. 3A illustrates a first cross-sectional view of a wireless headphone according to a second example.
Figure 4:
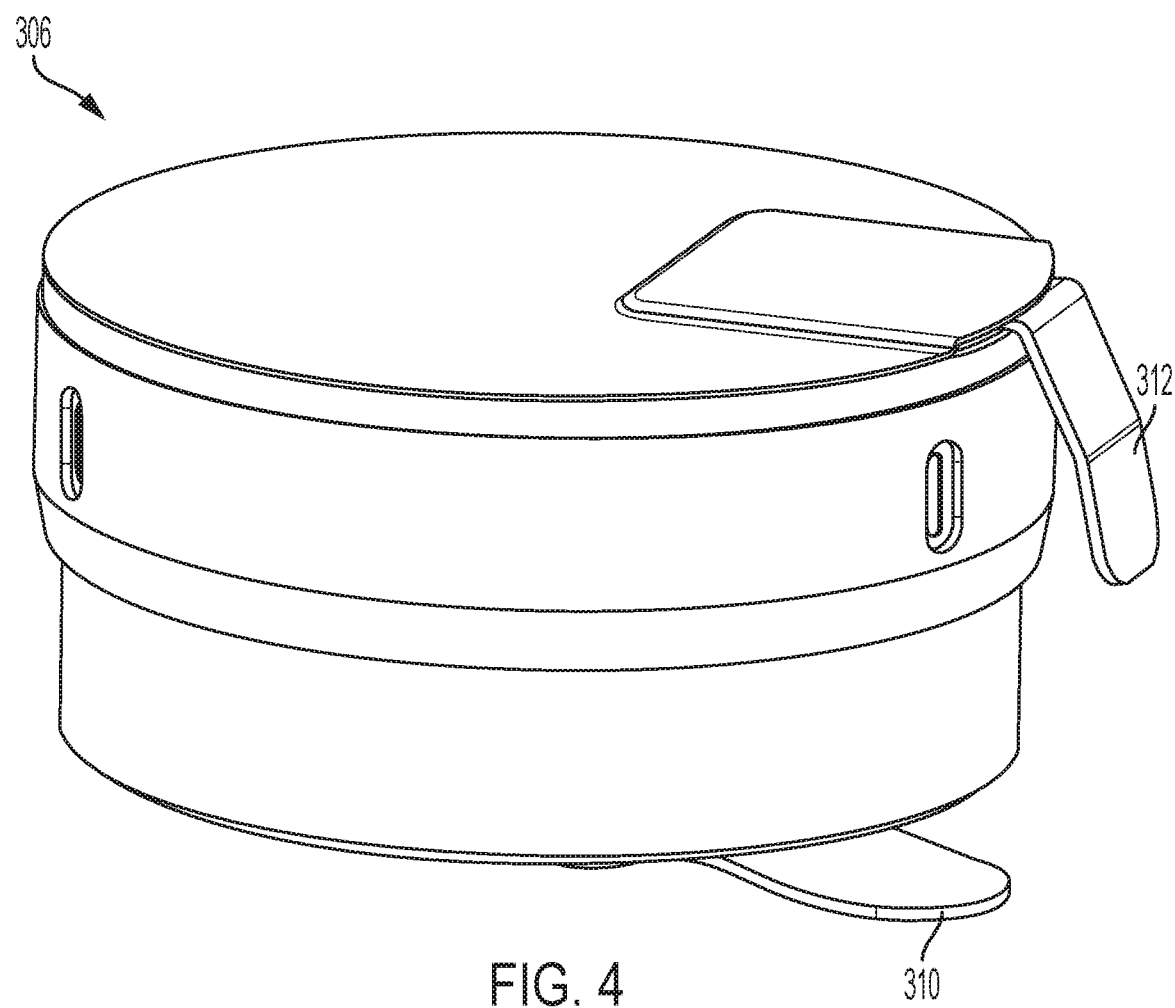
FIG. 4 illustrates a perspective view of a wireless headphone battery according to an example.

FIG. 3A illustrates a first cross-sectional view of a wireless headphone 300 according to an example. The wireless headphone 300 includes a cap 302, a PCB 304, a battery 306, and a housing 308. The battery 306 includes a first electrical connector 310 and a second electrical connector 312. FIG. 4 illustrates a perspective view of the battery 306 in greater detail, including the first electrical connector 310 and the second electrical connector 312. The battery 306 may be a lithium ion battery.

The cap 302 is configured to be mechanically coupled to the PCB 304 in a similar manner as the cap 102 and the PCB 108. For example, the cap 302 may be mechanically coupled to the PCB 304 using heat stakes. The cap 302 may be configured to be mechanically coupled to the housing 308 subsequent to the cap 302 and the PCB 304 being mechanically coupled together. For example, the cap 302 may be inserted into the housing 308 to form an interference fit around a circumference of the cap 302 and the housing 308, or may be connected to the housing 308 using an adhesive.

Thus, while the formation and insertion of the cap 302 and the PCB 304 into the housing 308 is not specifically described, it is to be appreciated that the cap 302 and the PCB 304 may be mechanically coupled together and inserted into the housing 308 in a similar manner as the cap 102 and the PCB 108 as discussed above with respect to FIG. 2. In some examples, the cap 302 and the PCB 304 may be identical to the cap 102 and the PCB 108.

In addition to creating a mechanical connection between the cap 302 and the housing 308, inserting the cap 302 into the housing 308 creates electrical connections between the PCB 304 and the battery 306. More specifically, inserting the cap 302 into the housing 308 creates a first electrical connection between the PCB 304 and the battery 306 via the first electrical connector 310, and creates a second electrical connection between the PCB 304 and the battery 306 via the second electrical connector 312.

FIG. 3B illustrates a second cross-sectional view of the wireless headphone 300. FIG. 3B illustrates the first electrical connection between the PCB 304 and the battery 306 in greater detail, after the cap 302 and the PCB 304 have been inserted into the housing 308. The wireless headphone 300 includes the cap 302, the PCB 304, the battery 306, the housing 308, and the first electrical connector 310. The PCB 304 includes a pogo pin 314. Similar to the pogo pin 112, the pogo pin 314 may be mechanically coupled to the PCB 304 (for example, via a soldered connection) at a first end.

The first electrical connector 310 may be embodied as an electrically conductive spring tab which extends from the battery 306. The first electrical connector 310 may be aligned with the pogo pin 314 such that, when the cap 302 is inserted into the housing 308, a second end of the pogo pin 314 depresses against the first electrical connector 310 to form an electrical connection. A spring internal to the pogo pin 314 forces the second end of the pogo pin 314 against the first electrical connector 310 to ensure a suitably conductive electrical connection between the pogo pin 314 and the first electrical connector 310. Accordingly, the combination of the first electrical connector 310 and the pogo pin 314 ensures a reliable electrical connection when the cap 302 is inserted into the housing 308, even if the wireless headphone 300 is blindly assembled.

Figure 3C:
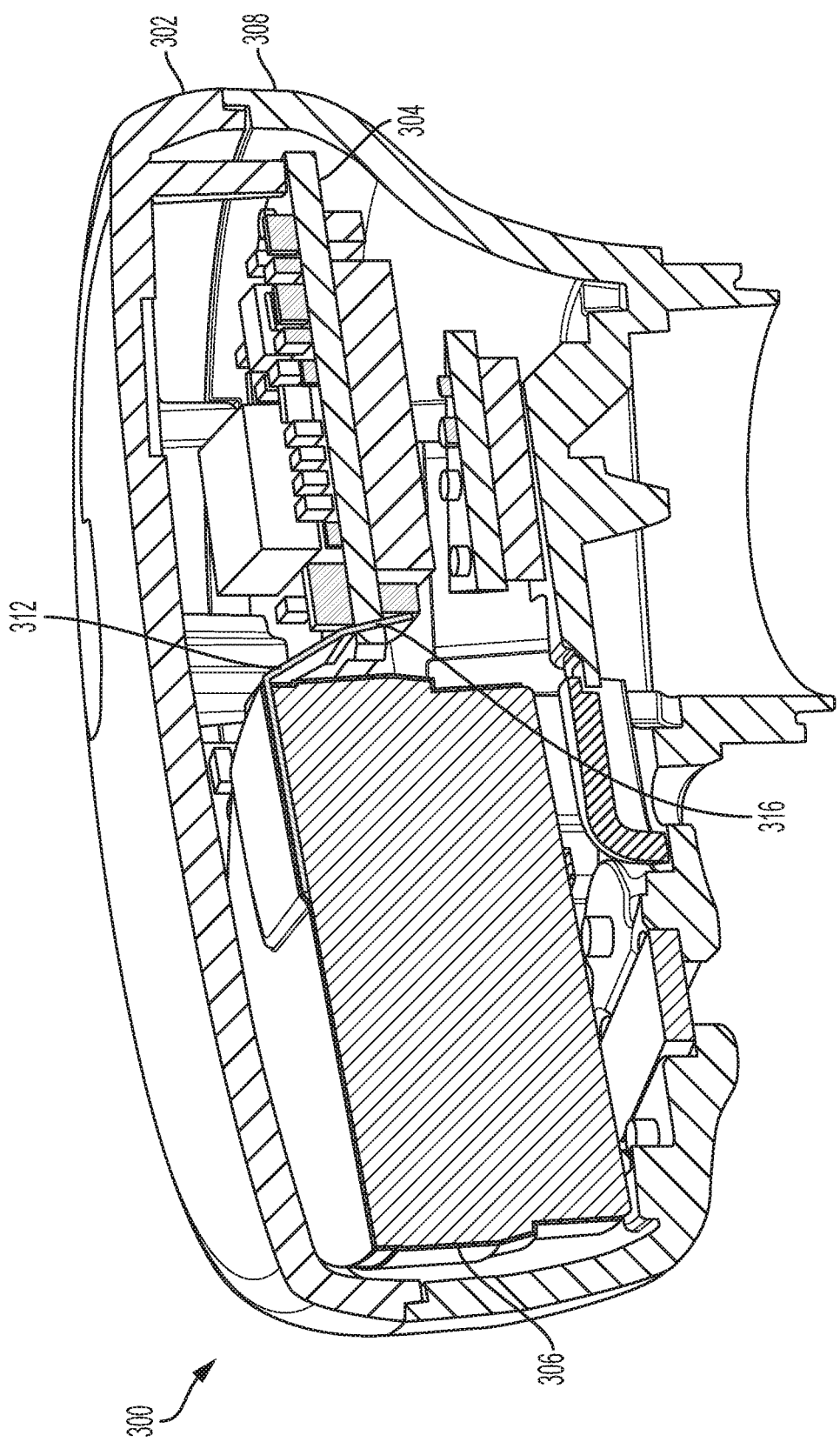
FIG. 3C illustrates a third cross-sectional view of a wireless headphone according to the second example.

FIG. 3C illustrates a third cross-sectional view of the wireless headphone 300. FIG. 3C illustrates the second electrical connection between the PCB 304 and the battery 306 in greater detail, after the cap 302 and the PCB 304 have been inserted into the housing 308. The wireless headphone 300 includes the cap 302, the PCB 304, the battery 306, the housing 308, and the second electrical connector 312. The PCB 304 includes a castellation 316.

The second electrical connector 312 may be embodied as an electrically conductive spring tab which extends from the battery 306. For example, the second electrical connector 312 may be curved such that the second electrical connector 312 deflects towards the battery 306 responsive to exertion of a downward (i.e., in the direction of the battery 306 axis) force on the second electrical connector 312. The second electrical connector 312 may be aligned with the castellation 316 such that, when the cap 302 is inserted into the housing 308, the castellation 316 contacts the second electrical connector 312 and exerts a downward force on the second electrical connector 312.

The second electrical connector 312 deflects towards the battery 306, and exerts a restoring force against the castellation 316 to ensure a reliably conductive connection between the second electrical connector 312 and the castellation 316. Accordingly, the combination of the second electrical connector 312 and the castellation 316 ensures a reliable electrical connection when the cap 302 is inserted into the housing 308, even if the wireless headphone 300 is blindly assembled.

The wireless headphone 300 is thus capable of being blindly assembled with the PCB 304 mounted to the cap 302. The battery 306 is constructed and positioned to enable electrical connections to be reliably formed when the PCB 304 is inserted into the housing 308, even if the wireless headphone 300 is blindly assembled. In addition to enabling repeatability in blind assembly of the wireless headphone 300, positioning the battery 306 to be adjacent to the PCB 304 enhances the safety of the battery 306.

More specifically, because the battery 306 is not constrained from expanding by the housing 308, the battery 306 is capable of safer failure in response to an abnormal thermal event. The battery 306 may be designed to expand to expose thermal vents when heated, which allows the battery 306 to vent heat and thereby fail safely in the event of abnormal thermal runaway.

Battery thermal expansion may be constrained or unconstrained. Constrained expansion refers to a situation in which a battery is incapable of freely expanding in response to a thermal event. For example, a battery may be constrained where a battery housing acts as a physical barrier which prevents free expansion of the battery. Unconstrained expansion refers to a situation in which a battery is capable of freely expanding in response to a thermal event.

The battery 306 is maintained in the housing 308 in an unconstrained manner by being positioned horizontally adjacent to the PCB 304, and is not constrained from expanding by the housing 308. Thus, the battery 306 is more likely to fail safely as compared to battery arrangements in conventional wireless headphone architectures that have batteries vertically displaced from a corresponding PCB, in which the batteries are more likely to be constrained against a battery housing.

Although the first and second electrical connectors 310, 312 are illustrated as spring tabs mounted on certain locations on the battery 306, and although the PCB 304 is illustrated as including a pogo pin 314 and a castellation 316 (each of which may be referred to generally as an electrical connector), in alternate examples, alternate implementations are possible. For example, the first and the second electrical connectors 310, 312 could both be spring tabs configured to deflect against respective castellations of the PCB 304.

In another example, the PCB 304 could include at least two pogo pins. Each of the pogo pins may be configured to depress against one of the first and second electrical connectors 310, 312. In another example, one or both of the first and second electrical connectors 310, 312 may include a pogo pin configured to depress against a conductive pad on the PCB 304. In other examples, any combination of the foregoing, or other means of creating an electrical connection, may be implemented to electrically couple the PCB 304 to the battery 306.

Although the first and second electrical connectors 310, 312 are illustrated as being coupled to opposite axial faces of the battery 306, in other examples, the first and second electrical connectors 310, 312 may be coupled to the same axial face of the battery 306. Furthermore, although the first and second electrical connectors 310, 312 are illustrated as protruding from the battery 306 at specific positions along the circumference of the battery 306, in other examples, the first and second electrical connectors 310, 312 may be positioned at any position along the circumference of the battery 306.

Wireless headphone architectures having a high degree of repeatability has been provided. The wireless headphone architectures are "repeatable," or capable of being consistently manufactured with a tolerable degree of antenna resonant frequency variation, because they are constructed such that a length of a conductive path between an antenna and a PCB may vary within a small tolerance range. A battery configuration which allows for blind assembly of the wireless headphone is provided to facilitate the repeatable headphone architectures. Repeatability in the length of the conductive path provides repeatability in wireless headphones' resonant frequencies, which minimizes frequency detuning. Accordingly, the wireless headphone architectures provided provide enhanced frequency characteristics.

Having thus described several aspects of at least one example, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A wireless headphone comprising:
   a wireless headphone cap comprising an antenna embedded in the wireless headphone cap; and
   a printed circuit board (PCB) configured to be:
      directly mechanically connected to the wireless headphone cap at a fixed distance from the wireless headphone cap; and
      electrically connected to the antenna.

2. The wireless headphone of claim 1, wherein the antenna is formed using laser direct structuring.

3. The wireless headphone of claim 1, wherein the PCB is configured to be electrically connected to the antenna via a pogo pin.

4. The wireless headphone of claim 3, wherein the pogo pin comprises a first end and a second end, and wherein:
   a first end of the pogo pin is configured to be mechanically coupled to the PCB; and
   a second end of the pogo pin is configured to contact the wireless headphone cap.

5. The wireless headphone of claim 4, wherein the wireless headphone cap comprises a first surface and a second surface, and wherein:
   the antenna is formed on the first surface of the wireless headphone cap;
   the second end of the pogo pin is configured to contact the second surface of the wireless headphone cap; and
   the first surface of the wireless headphone cap is electrically connected to the second surface of the wireless headphone cap through a via formed through the wireless headphone cap.

6. The wireless headphone of claim 5, wherein a length of a conductive path between the via and the PCB is approximately equal to a distance between the second surface of the wireless headphone cap and the PCB.

7. The wireless headphone of claim 1, wherein the PCB is configured to be directly mechanically connected to the wireless headphone cap using heat stakes.

8. The wireless headphone of claim 7, wherein a resonant frequency of the antenna corresponds directly to a distance between the PCB and the wireless headphone cap.

9. The wireless headphone of claim 8, wherein the distance between the PCB and the wireless headphone cap corresponds directly to a tolerance in a length of the heat stakes.

10. A method of producing a wireless headphone, comprising:
    providing a wireless headphone cap including an antenna embedded in the wireless headphone cap;
    mechanically coupling a printed circuit board (PCB) directly to the wireless headphone cap at a fixed distance from the wireless headphone cap;
    electrically coupling the PCB to the antenna; and
    mechanically coupling the wireless headphone cap to a wireless headphone housing.

11. The method of claim 10, wherein electrically coupling the PCB to the antenna comprises:
    mechanically coupling a pogo pin to the PCB; and
    electrically coupling the pogo pin between the PCB and the antenna.

12. The method of claim 10, wherein the wireless headphone cap comprises heat stakes, and wherein mechanically coupling the PCB directly to the wireless headphone cap comprises:
    inserting the heat stakes through openings in the PCB; and
    heating the heat stakes to mechanically couple the heat stakes to the PCB.

13. The method of claim 12, wherein mechanically coupling the wireless headphone cap to the wireless headphone housing comprises mechanically coupling the wireless headphone cap to the wireless headphone housing subsequent to heating the heat stakes to mechanically couple the heat stakes to the PCB.

* * * * *